United States Patent

Collis

[15] 3,696,670

[45] Oct. 10, 1972

[54] METHOD AND SYSTEM FOR DETECTING CLEAR AIR TURBULENCE

[72] Inventor: Ronald T. H. Collis, Menlo Park, Calif.

[73] Assignee: Stanford Research Institute

[22] Filed: July 9, 1970

[21] Appl. No.: 53,613

[52] U.S. Cl. .......... 73/170 R, 73/355 R, 250/83.3 H, 343/100 ME
[51] Int. Cl. ............................................. G01w 1/08
[58] Field of Search ............. 73/170 R, 355; 325/363; 343/100 ME; 250/83.3 H

[56] References Cited

UNITED STATES PATENTS

| | | |
|---|---|---|
| 3,475,963 | 11/1969 | Astheimer....343/100 ME UX |
| 3,498,132 | 3/1970 | Smith et al......343/100 ME X |
| 3,056,958 | 10/1962 | Anderson.....343/100 ME UX |
| 3,402,295 | 9/1968 | Astheimer....343/100 ME UX |

Primary Examiner—Jerry W. Myracle
Attorney—Flehr, Hohbach, Test, Albritton & Herbert

[57] ABSTRACT

A method and system is disclosed which utilizes the radiation emitted by regions of clear air turbulence to remotely detect such regions. An airborne radiometer receives a plurality of signals from ahead of an aircraft at a plurality of angles with respect to the aircraft's path. These signals are compared to form a gradient signal. The rate of change of the gradient signal is monitored to give an indication of clear air turbulence.

12 Claims, 6 Drawing Figures

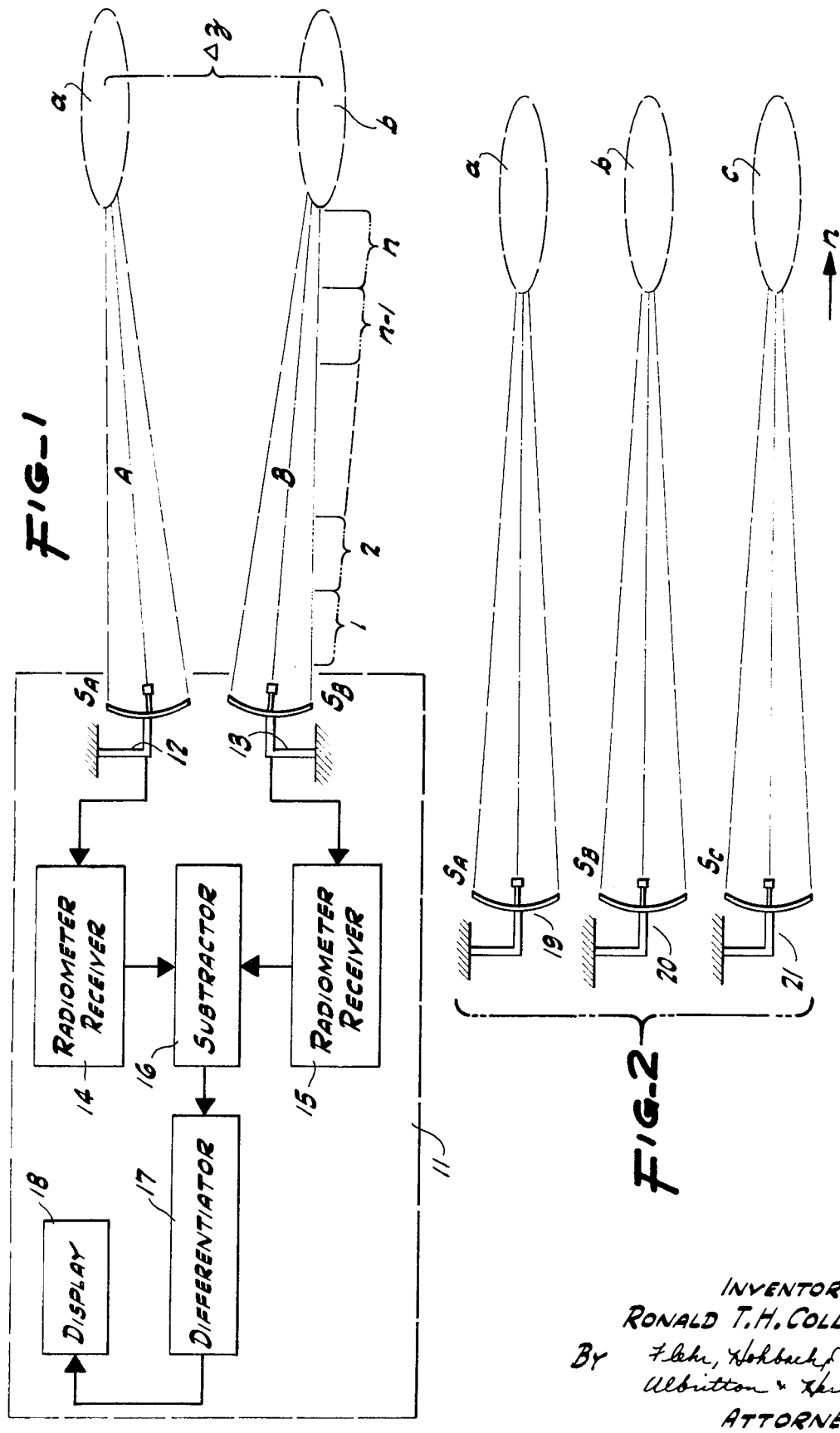

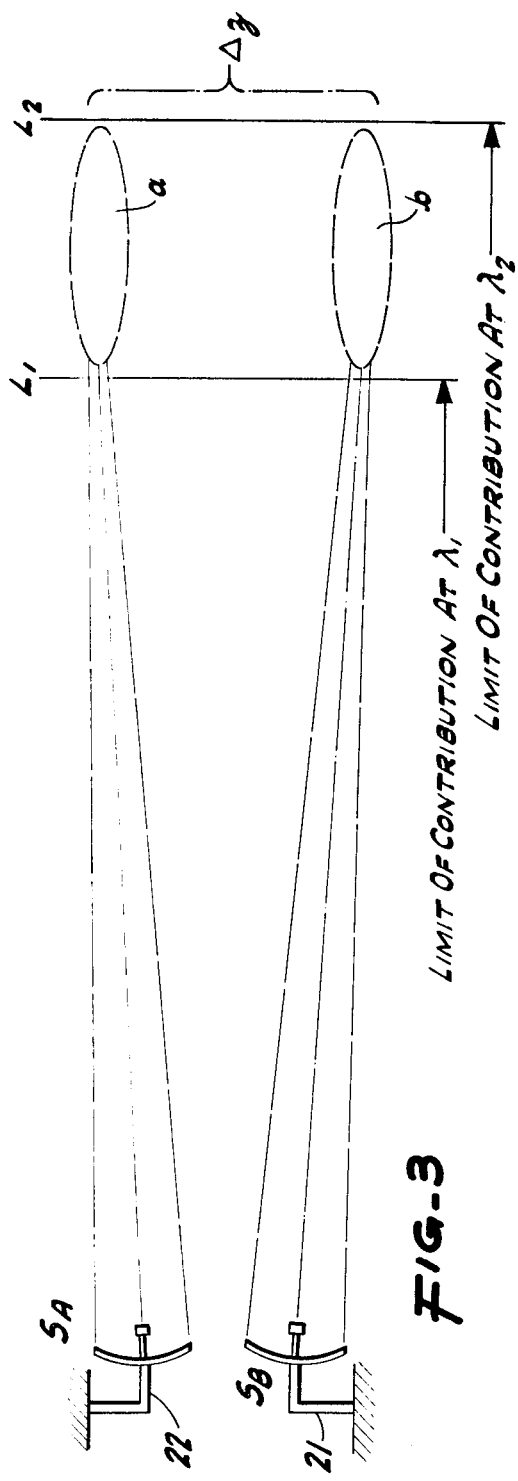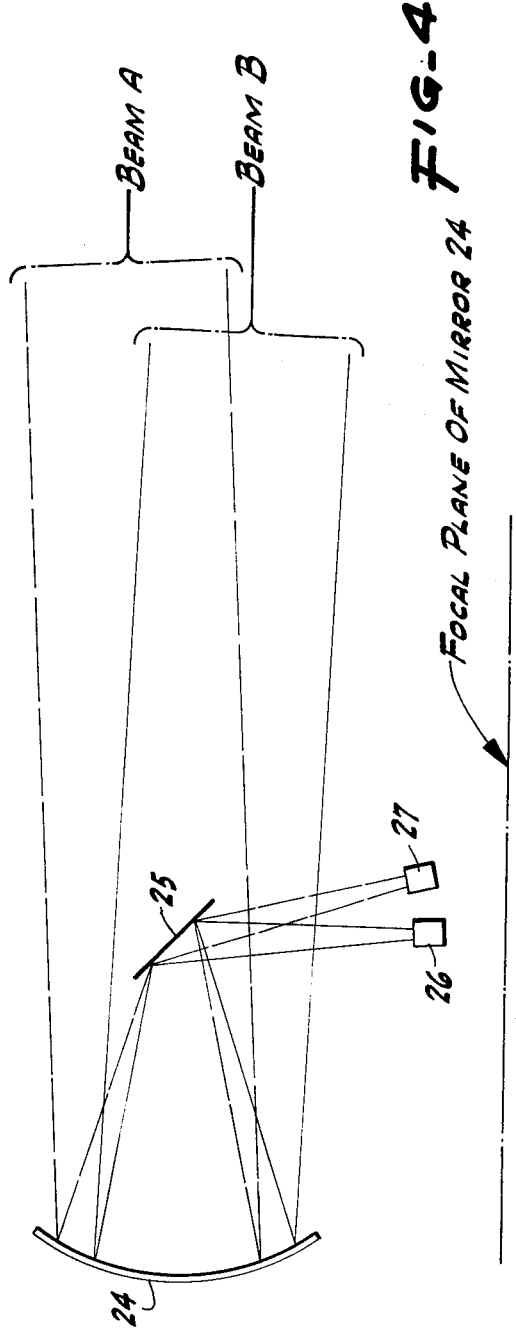

METHOD AND SYSTEM FOR DETECTING CLEAR AIR TURBULENCE

BACKGROUND OF THE INVENTION

This invention relates generally to radiation detection means and more particularly to a system for detecting regions of clear air turbulence by reception and comparison of the radiation give off by such regions.

It has been observed that aircraft frequently encounter turbulence which is not directly associated with cumulus clouds or thunderstorms. This turbulence, which has become known as clear air turbulence, gives little or no visual or radar indication of its presence. The need to detect such turbulence several miles beforehand and change the speed or course of the aircraft in order to minimize the effect of the turbulence upon the aircraft and its cargo is evident.

There appear to be several causes of clear air turbulence. These include upward deflection of air by mountain slopes, convective processes, vertical wind shear in portions of jet streams, etc. In almost all cases, whether as a feature of the causative conditions or as a result of the occurrence of turbulence, anomalies occur in the distribution of temperature in the atmosphere at and near the turbulent region.

Air emits microwave and infrared radiation whose power flux at a remote point depends upon the temperature of the air and the attenuation characteristics of the intervening air. The existence of a substantial temperature difference in clear air turbulent regions therefore enables such regions to be remotely detected in time to take the necessary preventative measures. This temperature difference can be detected by receiving the microwave or infrared energy with a radiometric receiver. Similarly, the anomalous variation of the incident of such indicators as ozone or water vapor has been found to be related to turbulent regions.

In order to provide remote warning of clear air turbulence that is directly associated with horizontal temperature gradients a number of radiometric techniques have been proposed and tried to detect such gradients ahead of an aircraft. One prior art system accomplishes this by radiometric scanning in frequency on the skirts of the $CO_2$ absorption band in order to provide an instantaneous reading of temperature variation along the aircraft path, which will thus show anomalies in gradients. In another prior system there is provided at each instant a single reading of effective temperature which is integrated over the whole path ahead of the aircraft and time history is relied upon to remotely reveal anomalies in the temperature gradients in the direction of the aircraft's path. These systems have, however, had disadvantages. They have been complex and expensive and have required a reference, such as black body for example, with which to compare the signals received by the radiometric receiver or radiometer. There have also been problems in stabilizing the airborne radiometers. Inasmuch as temperature varies considerably with vertical distance or altitude small pitch variations in the radiometer's alignment introduces substantial error and noise into its readings.

SUMMARY OF THE INVENTION

It is therefore an object of this invention to provide a device which is capable of detecting clear air turbulence.

It is another object of this invention to provide a method and device for detecting clear air turbulence which detects the turbulent regions sufficiently in advance of entry into the regions to give advance warning so that precautionary measures can be taken.

Ti is another object of this invention to provide a method and device for detecting clear air turbulence by monitoring the horizontal variation in the vertical temperature gradient.

It is another object of this invention to provide a method and device for detecting clear air turbulence by monitoring the incidence of ozone or water vapor in the atmosphere.

It is another object of this invention to provide a method and apparatus for detecting clear air turbulence by monitoring horizontal temperature variations, either in the direction of flight or at an angle thereto.

According to one embodiment of the invention a plurality of radiometric readings are taken ahead of an aircraft, but at different angles with respect to the aircraft. The radiometric readings are compared and a difference signal is generated which represents the different effective temperatures of volumes of air at a distance from the aircraft, but separated by a vertical or horizontal interval. Means are provided for considering this difference signal as a function of time and for providing an indication when the rate of change of the difference signal exceeds a predetermined value.

Additional objects and features of the invention will appear from the following description in which the preferred embodiments of the invention have been set forth in detail in conjunction with the drawings.

BRIEF DESCRIPTION OF THE DRAWINGS

FIG. 1 is a schematic illustration of an airborne clear air turbulence detector constructed in accordance with the principles of this invention.

FIG. 2 is another embodiment of this invention which utilizes three radiometer readings.

FIG. 3 is another embodiment of this invention in which radiometers sense radiation of more than one wavelength.

FIG. 4 is a schematic illustration of a practical embodiment of a clear air turbulence detector employing radiometers for sensing radiation in two directions.

DESCRIPTION OF THE PREFERRED EMBODIMENTS

Figure 5:
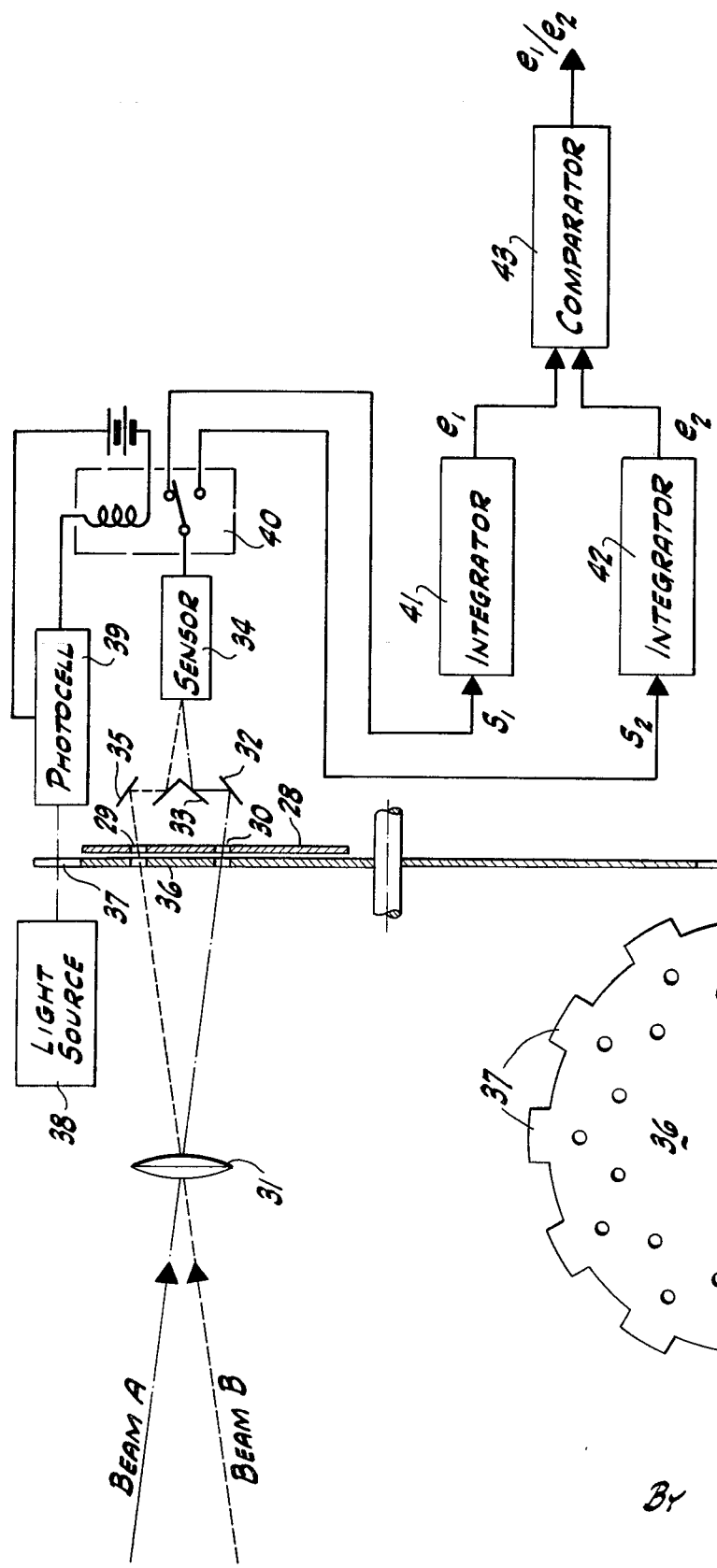
FIG. 5 is a schematic illustration of another practical embodiment of a clear air turbulence detector.

Referring now to FIG. 1, the clear air turbulence detector 11 is adapted to be mounted upon an aircraft (not shown) for detecting clear air turbulence during flight. Two radiometer antennas 12 and 13 are directed ahead of the aircraft but at different angles of elevation with respect to the aircraft's path. Antenna 12 looks along path A at an atmospheric volume $a$ and antenna 13 looks along path B at an atmospheric volume $b$. Due to the angle between paths A and B the atmoshperic volumes a and b are separated by a vertical distance $\Delta z$. Antennas 12 and 13 are respectively connected to a radiometer receivers 14 and 15, which separate and amplify the signals picked up by the antennas. The outputs of the radiometer receivers 14 and 15 are mathematically related to the respective temperatures of atmospheric volumes a and b and form the input to a subtractor 16.

The radiation which is received by the antennas 12 and 13 is determined by a penetration distance of the radiometer receivers and antennas. There are volumes of air all along the directions in which antennas 12 and 13 are oriented. The penetration distance is the most remote radiation that can be received and is determined by the wavelength to which the radiometer receivers and antennas are tuned and the attenuation characteristics of the atmosphere for radiation of that wavelength. This is more fully discussed hereinafter. In practice, the penetration distance is controlled by tuning the radiometer receivers and antennas to frequencies on the skirts of the $CO_2$ atmospheric absorption line.

The output signal of subtractor 16 represents the effective difference of temperature of the atmospheric volumes $a$ and $b$. This output signal forms the input to a differentiator 17. A signal is present at the output of differentiator 17 only when the difference in temperature of atmospheric volumes $a$ and $b$ is changing with time.

Normally, there is a substantial temperature gradient in a vertical direction. When temperature anomalies corresponding to clear air turbulence are encountered this gradient changes. Any change in the temperature gradient appears as a signal on the output of differentiator 17, which signal is displayed on a display 18. The presence of a signal on the display 18 warns the aircraft pilot that the aircraft is approaching a region of clear air turbulence. The pilot then has sufficient opportunity to change course and/or speed or initiate other corrective or preventative measures so as to avoid damage to the aircraft and its cargo.

The manner in which the radiometer apparatus of FIG. 1 functions can best be understood by considering the path along which each radiometer looks as a series of increments.

The radiation signals $S_{\lambda_n}$ at a given wavelength $\lambda$ from the nth increment with respect to a reference temperature is proportional to the product of the temperature difference $(\Delta I_n)$, ), the emissivity of the increment $e_{\Delta x}$, and the transmittance of the path to the segment, $t_x$.

The total radiation signal S for the total path will approximate to $$S_\lambda = \sum_{n=1}^{\infty} e_{\Delta x} t_{x_n} \Delta T_n.$$

The expression $e_{\Delta x t_{x_n}}$ also represents the attenuation characteristics of the atmosphere at the wavelength in question and may be expressed by the coefficient $C_n(+)$.

The length of the path to which the total radiation signal referes is limited i practice to the range from which the emitted energy from the nth segment contributes detectably to the received signal, i.e., after attenuation by the integration of $C_n$ over the intervening path. The length of this path can be change by changing the wavelength, for this will result in a different relationship between emissivity and attenuation.

Thus in FIG. 1 for an appropriate wavelength $\lambda$ (which it will be recalled may be selected in accordance with the $CO_2$ absorption line for controlling the penetration distance)

$$S_A = C_{1A} \Delta T_{1A} + C_{2A} \Delta T_{2A} ... + C_{nA} \Delta T_{nA}$$

$$S_B = C_{1B} \Delta T_{1B} + C_{2B} \Delta T_{2B} ... + C_{nB} \Delta T_{nB}$$

At close ranges, such as for increments 1, 2, 3, etc., the differences in $\Delta T$ and $C$ will be small between paths A and B. Thus, $$S_A - S_B \cong C_{nA} \Delta T_{nA} - C_{nB} \Delta T_{nB}$$

or $$S_A - S_B \cong \Delta T / \Delta z \text{ at range } n$$

By subtracting the temperature contributions of atmospheric volumes a and b, the contribution to the output of the subtractor 16 by the increments 1, 2, 3, etc., is minimized. That is, the temperature of atmospheric volumes along the path of the antennas 12 and 13 will be approximately equal at proximate regions to the antennas and will be farest apart at the atmospheric volumes a and b under consideration.

Referring now to FIG. 2, three or more observation angles can be employed in order to provide additional samples of the vertical temperature gradients. In FIG. 2 three antennas 19, 20, and 21 may be employed directed ahead of an aircraft at three different angles of observation. Then in accordance with the same calculations as made in connection with FIG. 1

$$S_A - S_B \simeq \frac{\Delta T}{\Delta z} (A, B) \text{ at range } n$$

$$S_B - S_C \simeq \frac{\Delta T}{\Delta z} (B, C) \text{ at range } n$$

The signals $S_A - S_B$ and $S_B - S_C$ may then be manipulated in any of several manners to yield the desired information. For example, these signals could be differentiated with their rate of change with respect to time generating a display.

It is also possible by the judicious selection and use of signals at two different wavelength to achieve improved accuracy; that is, contribution of increments at less than $n$ are further minimized. This embodiment is illustrated in FIG. 3. In FIG. 3, antennas 22 and 23 are directed ahead of the aircraft at different angles of elevation so as to look at atmospheric volumes $a$ and $b$ separated by a vertical distance $\Delta z$. During a first scan the radiometers are tuned for the reception of signals having a wavelength $\lambda_1$ so that the two signals on the antennas 22 and 23 are $SA\lambda_1$ and $SB\lambda_1$. The wavelength $\lambda_1$ is selected such that only increments located at L1 or closer to the aircraft contribute anything to the signal received at the antennas 22 and 23. That is, the penetration distance for radiation at $\lambda_1$ is $L_1$.

Then the radiometers are tuned to scan for signals having a wavelength $\lambda_2$. The wavelength $\lambda_s$ is selected so that atmospheric increments at L2 and closer to the aircraft all contribute to the signals received by the radiometer. Scanning at this wavelength $\lambda_2$ gives signals at antennas 22 and 23 given by $SA\lambda_2$ and $SB\lambda_2$. Then, the temperature differential between atmospheric volumes a and b may be more accurately defined as $$[S_A(\lambda_2) - S_A(\lambda_1)] - [S_B(\lambda_2) - S_B(\lambda_1)] \simeq \frac{\Delta T}{\Delta z}$$

It is obvious that this procedure yields a more accurate determination of the temperatures of the atmospheric volumes $a$ and $b$ since more of the unwanted contributions from near atmospheric segments to the signals present at the radiometer antennas are eliminated. It is within the principles of this invention to select a plurality of wavelengths each having different penetration characteristics so as to even more accurately eliminate all unwanted contributions from the signals present at the radiometer antennas.

Thus far a method and apparatus have been described for detecting clear air turbulence by observing the rate of change of the vertical temperature gradient at a distance ahead of an aircraft. The method and apparatus of this invention can also be utilized for detecting clear air turbulence by detecting variations in the horizontal temperature gradient ahead of an aircraft at an angle to the direction of flight. For example, two or more radiometers can be directed ahead of an aircraft of at the same elevation but to the right and left, respectively of the aircraft's path. The divergence of the two directions, as discussed before in connection with detection of vertical temperature gradients, tends to minimize unwanted contribution of near atmospheric segments to the signals received by the radiometer receivers. Multiple scans at multiple wavelengths can be employed to further minimize such unwanted contributions to the signals present at the radiometers. Further, time history of one radiometer can give gradients in the direction of flight. Also, the system and method of this invention is adaptable for detecting anomalies in the incidence of ozone or water vapor in the atmosphere, which it has been found are associated with clear air turbulence. This is done by tuning the radiometer receivers to the characteristic wavelengths of radiation emitted by ozone or water vapor. Such wavelengths are well known in the art.

Referring now to FIG. 4, there is shown a simple practical embodiment of a two-beam-radiometer system. Beams A and B are the two paths ahead of the aircraft which are of interest. These beams are reflected by a concave mirror or antenna 24 and then by a plane mirror 25. The focal plane of mirror 24 is as indicated in FIG. 4. Ahead, however, of this focal plane are located two radiometer sensors 26 and 27. Locating the sensors ahead of the focal plane of mirror 24 creates acceptance apertures or field stops which define the directions (A and B in this instance) for which radiation signals are received. The horizontal separation of the sensors 26 and 27 determines the vertical angle of separation of the beams A and B. If desired, the mirror 25 can by gyro controlled to maintain a constant direction with reference to a vertical or horizontal datum to compensate for pitch of the aircraft. The signals from the sensors 26 and 27 can then be compared by a subtractor and operated on by a differentiator, all as shown in FIG. 1.

A lens can be substituted for the mirror 24. Then the mirror 25 and sensors 26 and 27 are located on the opposite side of the lens from which the beams A and B enter. As in the case of a mirror, however, the sensors are located ahead of the focal plane of the lens. All the other considerations are similar for the case of a lens instead of a mirror.

Figure 6:
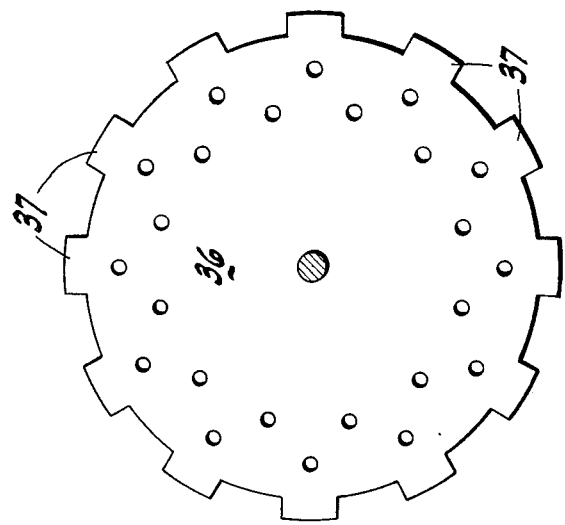
FIG. 6 is an elevation of the shutter of the clear air turbulence detector of FIG. 5.

Turning now to a consideration of FIG. 5, there is shown another practical embodiment for a two-beam sensing radiometer apparatus. A plane stop 28 has apertures 29 and 30 located at the focal plane of a lens 31 which define acceptance apertures for the two beams A and B. Beam A, which is accepted by aperture 30, is reflected by mirrors 32 and 33 onto a single sensor 34 and beam B passing through aperture 29 is reflected by a mirror 35 and mirror 33 onto the single sensor 34. A shutter 36 is situated in front of the plane stop 28. The shutter 36 has an aperture array that, by rotation, alternately opens and occludes a plurality of apertures 29 and 30 in plane stop 28 so that the single sensor 34 is sequentially exposed to incoming energy in beams A and B. The aperture array in shutter 36 may be more clearly seen in FIG. 6. The shutter 36 also has a toothed circumference 37. This toothed circumference 37 is utilized in conjunction with a light source 38 and photocell 39 for controlling a relay 40 which alternately switches the output of sensor 34 between an integrator 41 and an integrator 42. The integrators 41 and 42 generate output signals $e_1$ and $e_2$ which are respectively proportional to the signals on beam A and beam B over some period of time $\Delta I$. These integrated outputs $e_1$ and $e_2$ are then compared in a comparator 43. The comparator 43 can be a divider for yielding an output $e_1/e_2$. A change in this value $e_1/e_2$ is indicative of a change in the vertical temperature gradient between the atmospheric volumes $a$ and $b$ from which beams A and B originated. Alternatively, the comparator 43 can be a subtractor for generating an output $e_1 - e_2$. This output can be differentiated and the differentiated signal connected to a display. A signal then appears on the display only when the vertical temperature gradiant $e_1 - e_2$ is changing.

While specific embodiments of the invention have been shown and described, it will be obvious to those skilled in the art that certain modifications, substitutions and deletions can be made to the apparatus and method disclosed herein without departing from the scope of this invention.

I claim:

1. A method of detecting clear air turbulence comprising the steps of detecting radiation emitted by at least two atmospheric volumes, which volumes are at approximately the same distance from a radiation detector but are separated from each other, generating from said radiation at least two temperature signals corresponding to characteristics of said at least two atmospheric volumes, comparing said at least two signals and generating a compared signal, and detecting changes in said compared signal, whereby clear air turbulence is detected.

2. The method of claim 1 in which said atmospheric volumes are separated by a vertical distance.

3. The method of claim 1 in which said atmospheric volumes are separated by a horizontal distance.

4. The method of claim 1 in which microwave radiation is detected.

5. The method of claim 1 in which infrared radiation is detected.

6. The method of claim 1 in which said plurality of signals correspond to the temperatures of said atmospheric volumes, respectively.

7. The method of claim 1 in which said plurality of signals correspond to the ozone content of said atmospheric volumes, respectively.

8. The method of claim 1 in which said plurality of signals correspond to the water content of said atmospheric volumes, respectively.

9. Apparatus for detecting clear air turbulence from an aircraft comprising a radiometer for looking ahead of the aircraft at a plurality of angles with respect to the axis of the aircraft's flight for detecting radiation of a first wavelength emitted by first atmospheric volumes along said angles, means for generating from said radiation of a first wavelength a plurality of first temperature signals corresponding to the respective temperatures of said first atmospheric volumes, said radiometer also looking ahead of the aircraft at said same plurality of angles for detecting radiation of a second wavelength, said radiation of a second wavelength having different penetration characteristics from said radiation of a first wavelength, means for generating from said radiation of a second wavelength a plurality of second temperature signals corresponding to the respective temperatures of said second atmospheric volumes, means for subtracting said plurality of first temperature signals from said plurality of second temperature signals respectively to form a plurality of difference signals, means for comparing individual ones of said plurality of difference signals and generating a compared signal, and means for detecting and indicating changes in said compared signal whereby clear air turbulence is detected and indicated.

10. Apparatus for detecting clear air turbulence from an aircraft comprising a radiometer for looking ahead of the aircraft at a plurality of divergent angles with respect to the axis of the aircraft's flight for detecting radiation emitted by atmospheric volumes at approximately equal distances from the aircraft along said angles, means for generating from said radiation a plurality of temperature signals corresponding to the respective temperatures of said atmospheric volumes, means for comparing individual ones of said plurality of temperature signals and generating a compared signal, and means for detecting and indicating changes in said compared signal whereby clear air turbulence is detected and indicated.

11. A method of detecting clear air turbulence in front of a moving aircraft comprising the steps of detecting radiation of a predetermined wavelength along at least two divergent paths in front of the aircraft, the radiation of a pre-determined wavelength corresponding to characteristics of atmospheric volumes spaced along the two divergent paths at approximately equal pre-determined distances from the aircraft, generating from the radiation at least two temperature signals corresponding to characteristics of the atmospheric volumes, comparing the at least two signals and generating a comparison signal, the comparison signal being mostly determined by the most remote (from the aircraft) atmospheric volumes along the at least two divergent paths due to the most remote atmospheric volumes being more widely separated in space than nearer atmospheric volumes because of the divergence of the paths, and detecting changes in the comparison signal in order to detect clear air turbulence.

12. The method of claim 11 including the steps of detecting radiation of a second predetermined wavelength emitted by atmospheric volumes along said at least two paths, said radiation of said first wavelength having different atmospheric penetration characteristics from said radiation of said second predetermined wavelength, and subtracting said radiation having said first wavelength from said radiation having said second wavelength to form said plurality of temperature signals whereby only atmospheric volumes more remote than the penetration distance of said first wavelength and less remote from the penetration distance of said second wavelength are effective in generating said plurality of temperature signals.

* * * * *